United States Patent
Rowley et al.

(10) Patent No.: US 6,420,023 B1
(45) Date of Patent: Jul. 16, 2002

(54) PLASTICIZER RESISTANT LATEX EMULSION PRESSURE SENSITIVE ADHESIVE AND ITS PRODUCTION

(75) Inventors: Tony Kyle Rowley, Piqua; Raymond Scott Harvey, Worthington; Harvey Joseph Richards, Columbus, all of OH (US)

(73) Assignee: Ashland Chemical Company, Columbus, OH (US)

( * ) Notice: Subject to any disclaimer, the term of this patent is extended or adjusted under 35 U.S.C. 154(b) by 122 days.

(21) Appl. No.: 09/597,188

(22) Filed: Jun. 20, 2000

(51) Int. Cl.$^7$ ................................. B32B 27/30
(52) U.S. Cl. ................. 428/355 CN; 428/355 EN; 428/355 AC; 428/41.3; 428/41.5; 428/41.8; 524/800; 524/804; 524/833; 516/127
(58) Field of Search .............................. 428/41.3, 41.5, 428/41.8, 355 EN, 355 CN, 355 AC; 524/800, 804, 833; 516/127

(56) References Cited

U.S. PATENT DOCUMENTS

| | | | |
|---|---|---|---|
| 4,647,611 A | * | 3/1987 | Goldstein et al. .......... 524/458 |
| 5,332,854 A | * | 7/1994 | Yokota et al. ............. 588/33 |
| 5,416,134 A | * | 5/1995 | Skoglund .................. 523/201 |
| 5,922,780 A | * | 7/1999 | Dyer et al. ............... 521/150 |
| 5,928,783 A | * | 7/1999 | Phan et al. ........... 428/355 EN |

FOREIGN PATENT DOCUMENTS

JP  11001893  * 1/1999

* cited by examiner

Primary Examiner—Robert Dawson
Assistant Examiner—Christopher M. Keehan
(74) Attorney, Agent, or Firm—Mueller and Smith, LPA

(57) ABSTRACT

An aqueous, plasticizer-retardant pressure sensitive adhesive (PSA) is made from an aqueous latex emulsion having an average particle size diameter of not substantially above about 100 nm and made from a mixture of ethylenically-unsaturated monomers and oligomers that include one or more of N-(iso-butoxymethyl) acrylamide, N-(n-butoxymethyl) acrylamide, N-methylol acrylamide; and emulsified in the presence of an emulsifier consisting essentially of:

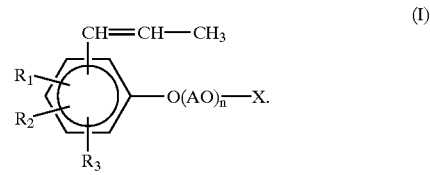

(I)

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, n is an integer ranging from 1 to 200, X is H or $SO_3M$, where M is an alkali metal, an ammonium ion, or an alkanolamine cation. Preferably, the ethylenically-unsaturated monomers include 2-ethylhexyl acrylate. Preferably, the emulsifier is:

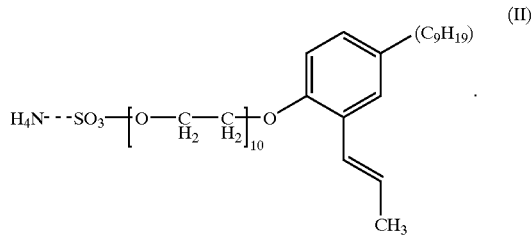

(II)

The preferred aqueous latex emulsion is prepared from a monomer mixture consisting essentially of at least one alkylacrylate having at least 4 carbon atoms in the alkyl chain, at least one ethylenically unsaturated carboxylic acid or its corresponding anhydride, at least one styrenic monomer, and N-(iso-butoxymethyl) acrylamide, and has a mean particle size diameter of less than or equal to about 100 nm.

18 Claims, No Drawings

PLASTICIZER RESISTANT LATEX EMULSION PRESSURE SENSITIVE ADHESIVE AND ITS PRODUCTION

CROSS-REFERENCE TO RELATED APPLICATIONS

This application is cross-referenced to commonly-assigned application Ser. No. 09/567,855, filed May 9, 2000, the disclosure of which is expressly incorporated herein by reference.

STATEMENT REGARDING FEDERALLY SPONSORED RESEARCH

Not applicable.

BACKGROUND OF THE INVENTION

The present invention relates to pressure sensitive adhesives (PSA's) based on aqueous latex emulsions and processes for the preparation of such adhesives.

Substrates (such as, for example, vinyl banners, vinyl binders, and vinyl containers) and face stocks (such as, for example, vinyl films and vinyl foams) contain plasticizers that make such products more pliable and less brittle. Often, these products are bonded with an adhesive (e.g., PSA's) onto similar substrates, metals, wood, and other materials. Unfortunately, the plasticizers in the substrates can migrate into the adhesive causing a loss of peel strength eventually leading to a product failure (residue, loss of peel strength). In particular, plasticizers used in the manufacture of vinyl foams (e.g., dioctylphthalate or DOP and dinonylphthalate or DINP) can migrate into a bonding PSA causing the adhesive peel strength to decrease, which eventually leads to product failure. In the case of automotive foams, manufacturers' specifications require minimum peel values over a range of environmental conditions for their PSA coated foam products. Traditional emulsion and solution PSA's fail to meet these specifications. Typical adhesives absorb the migrating plasticizers, which results in a loss of peel strength ending in adhesion failure.

The market would like a PSA, which can meet the automotive specifications and which would be resistant to plasticizer migration, thus extending the life of a product. The market also would prefer an emulsion adhesive having plasticizer resistance due to environmental and cost constraints, because emulsions are typically non-hazardous and less expensive than other technologies (e.g., solution, or UV prepared resinous adhesives). With an adhesive that has plasticizer resistant properties, the market could produce price competitive products (e.g., foam tapes, vinyl banner graphics, vinyl labels, and comfort mats), which would have extended usefulness and durability due to their resistance to plasticizer migration.

BRIEF SUMMARY OF THE INVENTION

An aqueous, pressure sensitive adhesive (PSA) resistant to plasticizer is made from an aqueous latex emulsion having an average particle size diameter of not substantially above about 100 nm and made from a mixture of ethylenically-unsaturated monomers and oligomers that include one or more of N-(iso-butoxymethyl) acrylamide, N-(n-butoxymethyl) acrylamide, and N-methylol acrylamide; and emulsified in the presence of an emulsifier consisting essentially of:

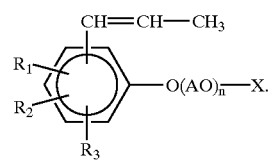

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, n is an integer ranging from 1 to 200, X is H or $SO_3M$, where M is an alkali metal, an ammonium ion, or an alkanolamine cation. Preferably, the ethylenically-unsaturated monomers includes 2-ethylhexyl acrylate, while 1,3-butanediol dimethacrylate can be added to increase cross-link density. Preferably, the emulsifier is:

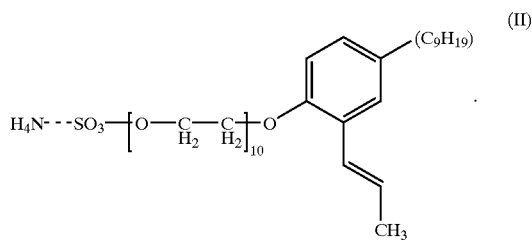

The preferred aqueous latex emulsion is prepared from a monomer mixture consisting essentially of at least one alkylacrylate having at least 4 carbon atoms in the alkyl chain, at least one ethylenically unsaturated carboxylic acid or its corresponding anhydride, at least one styrenic monomer, and N-(iso-butoxymethyl) acrylamide, and has a mean particle size diameter of less than or equal to about 100 nm.

DETAILED DESCRIPTION OF THE INVENTION

The inventive PSA is designed to maintain peel performance when the PSA in use is subjected to plasticizers that migrate from the surfaces of substrates and face stocks. The inventive PSA is based on a polymer or resin, which is polymerized with special additives and a selection of monomers to give the final adhesive resistance to plasticizers, water, and other solvents. The inventive PSA further was designed using a polymerizable surfactant, which is incorporated into the polymer. Such surfactant incorporation into the cured polymer contributes to the reduction of the adverse effects (e.g., loss of peel, shear, and tack) caused by migration of and interaction with plasticizers from the substrate being adhered by such PSA.

PSA's also need to maintain their adhesion at elevated temperatures (typically up to about 80° C.). These elevated temperatures also increase the rate at which plasticizers migrate from the substrate or face into the PSA layer. These elevated temperatures cause prior art PSA's to fail. The inventive PSA, however, is formulated using specialty monomers (e.g., n-isobutoxymethyl acrylamide or IBMA, and 1,3-butanediol dimethacrylate or 1,3 BDDMA) to increase the cross-linking density of the PSA polymer and, therefore, the heat aged stability of the PSA.

The inventive PSA is significantly better than PSA's currently available, whether based on emulsion, solution, and/or UV curable technologies. The inventive PSA has excellent resistance to plasticizers. Based on the data reported herein, only small decreases (on the order of <25% of initial values) in peel values are observed when the adhesive is aged at 80° C. for 10 days. Currently available PSA's typically lose about 80%–90% of their initial values. All other aging and cycle testing typically shows no loss in peel resulting in foam destruction for the inventive PSA, whereas other adhesives usually display a loss of around 50%–90% of initial peel values.

Referring now to the preparation of the PSA emulsion polymer, the polymerization is carried out in the presence of a reactive emulsifier or surfactant as described below. A thermal free-radical initiator system (e.g., persulfate, peroxide, or azo compound initiators) is used in an amount sufficient to promote free radical polymerization of the monomers. A redox type free-radical cure can be used advantageously to finish off the polymerization step or can be used in place of the thermal system in preparing the PSA emulsion polymer. Once the polymerization is complete it may be desirable to adjust the pH of the latex emulsion in order to enhance its stability. Other ingredients commonly used in the preparation of aqueous latex emulsions such as buffering agents, chain transfer agents, and the like may be present. General latex technology is discussed in, Kirk-Othmer, *Encyclopedia of Technology*, [4thEd.], vol.15, p.51–65; which is hereby incorporated by reference. In addition to the aqueous latex emulsion, the pressure sensitive adhesive may also contain additional components such as, biocides, wetting agents, defoamers, tackifiers, rheology modifiers, etc.

The reactive surfactant or emulsifier consists essentially of a compound represented by the following general structure:

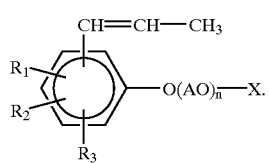
(I)

In structure I, $R_1$ is an alkyl, alkenyl, or aralkyl group containing between 6 and 18 carbon atoms, $R_2$ is H or $R_1$, $R_3$ is H or a propenyl group; A is an alkylene group of 2 to 4 carbon atoms, n is an integer ranging from 1 to 200, X is H or $SO_3M$, where M is an alkali metal, an ammonium ion, or an alkanolamine cation. This reactive emulsifier can be made in accordance with the procedure described in U.S. Pat. No. 5,332,854, the disclosure of which is expressly incorporated herein by reference.

Preferably, the emulsifier has the following general structure:

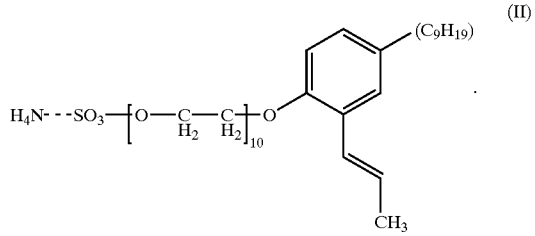
(II)

This preferred emulsifier is commercially available from Montello (Tulsa, OK) as Hitenol BC-10, poly(oxy-1,2-ethanediyl),α-sulfo-ω-[4-nonyl-2-(1-propenyl) phenoxy]-branched ammonium salts; yellowish brownish viscous liquid, 97.0 % actives, combined sulfuric acid content of 8.70–9.70%, pH of 6.5–8.5 (1% aqueous solution). Typically, less than 4 wt-%, and desirably less than 1 wt-%, of the reactive surfactant based on the total weight of the latex (solids basis), is used.

The reactive emulsifier can be employed with a variety of latex emulsions for formulating the novel PSA's. The monomers used to prepare such aqueous lattices include alkyl acrylates, ethylenically unsaturated carboxylic acids and their corresponding anhydrides, and styrenic monomers.

Alkyl acrylates are alkyl esters of acrylic or methacrylic acid having at least 4 carbon atoms in the alkyl portion of the molecule. Examples include butyl acrylate, isobutyl acrylate, heptyl acrylate, octyl acrylate, iso-octyl acrylate, 2-ethylhexyl acrylate, and iso-decyl acrylate. A single alkyl acrylate or mixtures of more than one alkyl acrylate can be used. A preferred alkyl acrylate is 2-ethylhexyl acrylate. The alkyl acrylate monomers are present in the monomer mixture in an amount from about 20 wt-% to about 60 wt-% based on the total weight of the monomer mixture.

Examples of ethylenically unsaturated carboxylic acids and their corresponding anhydrides used in the present invention include acrylic acid, methacrylic acid, maleic acid, fumaric acid, itaconic acid, beta-carboxyethyl acrylate and maleic anhydride. A single ethylenically unsaturated carboxylic acid or its corresponding anhydride or mixtures thereof can be used. A preferred carboxylic acid is acrylic acid. The ethylenically unsaturated carboxylic acids or their corresponding anhydrides are present in the monomer mixture in amounts from about 0.5 wt-% to about 4 wt-% based on the total weight (solids basis) of the monomer mixture.

Examples of styrenic monomers used in the present invention include styrene, t-butyl styrene, dimethyl styrene, and vinyl toluene. A preferred monomer is styrene. The styrenic monomers are present in the monomer mixture in amounts ranging from about 5 wt-% to about 30 wt-% based on the total weight of the monomer mixture.

Additionally, it has been determined that inclusion of N-(iso-butoxymethyl) acrylamide, N-(n-butoxymethyl) acrylamide, N-methylol acrylamide in synthesizing the PSA latex, along with the reactive emulsifier results in a PSA latex that exhibits excellent resistance to plasticizers, especially at elevated temperatures. It appears that this monomer contributes cross-linking to the system to produce a polymer having a greater cohesive strength. The amount of this ingredient can range from about 0.1 wt-% to about 3 wt-% based on the total weight of the monomer mixture.

Cross-link density also can be increased by using specialty monomers, such as, for example, 1,3-butanediol dimethacrylate (1,3 BDDMA) in an amount of less than about 1 wt-%. Additionally, mercaptan chain transfer agents can be included, such as, for example, n-dodecylmercaptan, in small amounts, e.g., less than about 1 wt-%.

A thermal free-radical initiator system is used to promote polymerization of the monomers. Typical conventional initiators are used, such as, for example, persulfates, peroxides, and azo compounds. Representative such free-radical initiators include, e.g. hydrogen peroxide, sodium persulfate, potassium persulfate, and ammonium persulfate.

A redox type free-radical initiator system can be used to finish off or complete the polymerization, if desired, or it can be used instead of the thermal free-radical initiator system. The initiator may be peroxide or hydroperoxide such as t-butyl hydroperoxide. The reducing agent used in the redox system may be zinc formaldehyde sulfoxylate, sodium formaldehyde sulfoxylate, ascorbic acid, iso-ascorbic acid, sodium metabisulfite and the like. A preferred redox type system consists of t-butyl hydroperoxide and zinc formaldehyde sulfoxylate.

The aqueous latex emulsions, which form the basis of the pressure sensitive adhesives of the present invention, are prepared in a single stage synthesis with or without a seed in the reaction vessel prior to beginning the monomer feed. Reaction temperatures during the monomer feed can range from about 50° C. to about 90° C. A reaction vessel is charged with deionized water, an anionic surfactant and a predetermined amount of initiator. If a seed is to be used, the mixture in the reaction vessel is heated with stirring and up to 20 wt % of the pre-emulsion, more preferably up to 8 wt-% and most preferably 4 wt-% is added to the reaction vessel along with a predetermined amount of the reducing agent to form the seed. After forming the seed, the contents of the reaction vessel are heated to a desired temperature and the pre-emulsion, initiator and the reducing agent are simultaneously metered into the reaction vessel with stirring. Preferably, however, the pre-emulsion is polymerized in the vessel without use of a seed.

It has been found to be advantageous to mix the pre-emulsion and initiator. This can be accomplished by merging the pre-emulsion and initiator feed streams and passing the merged stream through a static mixer or by simply allowing the two feed streams to converge in a common feed line. Alternatively, the initiator can be added to the reactor charge resulting in a single pre-emulsion feed. On completion of the pre-emulsion feed, the contents of the reaction vessel are cooled and all ingredients are charged into the reactor. Once the reaction is complete the pH may be adjusted. The pH of the aqueous latex emulsion is preferably adjusted to a pH of about 6 to about 9 and more preferably about 6 to about 7.5. For efficiency and economy an aqueous solution of ammonium hydroxide can be used to adjust the pH. Other bases that may be used include amines, imines, alkali metal and alkaline metal hydroxides, carbonates, etc. It will be appreciated that other reaction schemes can be used in preparing the PSA latex emulsion, as those skilled in this art will appreciate.

In addition to the aqueous latex emulsion, the pressure sensitive adhesive composition advantageously contains biocides, wetting agents, defoamers, rheology modifiers, etc. Examples of suitable biocides include Kathon LX, commercially available as a 1.5% solution from Rohm & Haas and Metatin 910, commercially available from ACIMA. An example of a suitable wetting agent is Surfynol SE commercially available from Air Products, PLURONIC® type polyols commercially available from BASF Corp, and the like. Examples of defoamers include Drewplus T-1201 and Drewplus 1-191 commercially available from Ashland Specialty Chemical Company, and Rhodoline 6681, commercially available from Rhodia.

The pressure sensitive adhesives described above can be used to prepare articles such as tapes (e.g., rolls of tape), labels, signs, marking films, and the like. In a typical construction the pressure sensitive adhesive is coated or otherwise applied to a release liner such as a siliconized paper, dried, and laminated to a facestock. Alternatively, the pressure sensitive adhesive is coated directly on a facestock. Examples of facestocks include vinyl foams, cellulosics, metal foils, polycarbonates, polyethylene, polypropylene, polyethylene terephthalate, and vinyl films.

The pressure sensitive adhesives typically have a viscosity after adjusting the pH to between about 6 and about 8 of from about 100 to about 3,500 centipoises, and a non-volatiles (nv) solids content ranging broadly from about 40% to 60% and advantageously from about 45% to 55%. The pressure sensitive adhesives exhibit a shear-thinning rheology such that it allows coating even on difficult to coat films. Conventional coating techniques can be used to apply the pressure sensitive adhesives. Such techniques include dipping, slot die, air knife, brush curtain, extrusion blade, reverse roll, squeeze roll coating, and the like.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

The following test procedures were used in the examples:
1. 180° Peel Test: PSTC-1 (November 1975), Pressure Sensitive Tape Council, Glenview, Ill. Results of this test are reported in pounds/inch for a 1 in strip.
2. 178° Shear Test: PSTC-7 using ½×1×1000 g (November 1975).

Pressure Sensitive Tape Council. Results of this test are reported in hours/1000 gm/0.5 $in^2$ at 22° C.

Example 1

A typical synthesis scheme for preparing the novel PSA is set forth below.

The components used are listed in Table 1.

TABLE 1

| Component | % Based on Latex |
|---|---|
| Water | 151.64 |
| Sodium bicarbonate | 0.09 |
| Hitenol BC-1025* | 2.61 |
| t-butyl hydroperoxide (70%) | 0.04 |
| Sodium formaldehyde sulfoxylate | 0.04 |
| 2-Ethyl hexylacrylate | 18.13 |
| Butyl acrylate | 12.54 |
| Styrene | 8.95 |
| Methyl acrylate | 4.48 |
| Acrylic acid | 0.67 |
| Ammonium persulfate | 0.22 |
| n-Isobutoxymethyl acrylamide | 0.34 |
| n-Dodecylmercaptan | 0.01 |
| 1,3-Butanediol dimethacrylate | 0.11 |
| Kathon-LX* (1.5%) | 0.13 |
| TOTAL | 100 |

*Hitenol BC-1025 is poly(oxy-1,2-ethanediyl),α-sulfo-ω-[4-nonyl-2-(1-propenyl)phenyoxy]-branched ammonium salts; yellowish brownish viscous liquid, 25% actives, combined sulfuric acid content of 8.70–9.70%, pH of 6.5–8.5, supplied by Montello, Tulsa, OK.
Kathon LX biostat, Rohm & Haas Company.

Preparation of Pre-emulsion

To a one gallon Nalgene container was charged de-ionized water (681.60 g), $NaHCO_3$ (2.84 g), and Hitenol BC-1025 polymerizable anionic surfactant (78.10 g). The container was placed under a turbine agitator and adjusted to 400 rpm. The following were slowly added to the container: acrylic acid (21.30 g), 2-ethylhexyl acrylate (575.10 g), butyl acrylate (397.60 g), methyl acrylate (142.00 g), styrene (284.00 g), n-(isobutoxymethyl)acrylamide (IBMA, 10.65 g), n-dodecyl mercaptan (0.28 g), and 1,3 butanediol dimethacrylate (3.55 g). Agitation of the emulsion was continued for 30 minutes. The pre-emulsion then was transferred to the reservoir of a metering pump system for eventual delivery to the polymerization reaction vessel.

Reactor Charge and Polymerization

To 4000 ml jacketed reaction vessel equipped with a turbine agitator, thermocouple, $N_2$ sparge, electronically controlled tempered water bath, and delivery lines for the pre-emulsion, was added de-ionized water (852.00 g) and Hitenol BC-1025 polymerizable surfactant (4.69 g). A $N_2$ sparge was started, the agitation speed was set to 150 rpm, and the temperature was set to 75° C. When the temperature reached 75° C., a solution of de-ionized water (21.30 g) and ammonium persulfate (5.68 g) was added to the reaction vessel. Two minutes after the solution was added, the pre-emulsion feed described above was commenced. Formation of a translucent blue dispersion within a few minutes indicated that the polymerization had initiated.

Heating was continued to the controlled polymerization temperature of 85° C. The addition rate was adjusted to feed the pre-emulsion over a three-hour period at a reaction temperature of 85° C. At the completion of the feed, de-ionized water (42.60 g) was added to the pre-emulsion reservoir to rinse the lines and an additional solution of de-ionized water (21.30 g) and ammonium persulfate (1.42 g) was added to the reaction vessel. The reaction was held at 85° C. for one additional hour after which cooling was started.

At the beginning of cooling, a solution of initiator (70% t-BHP, 0.57 g) and de-ionized water (4.73 g) was added to the reaction vessel followed 5 minutes later with a solution of a reducing agent (SFS, 0.57 g) and de-ionized water (4.73 g). When the temperature reached 500 C, a solution of initiator (70% t-BHP, 0.57 g) and de-ionized water (4.7 3g) was added to the reaction vessel followed 5 minutes later with a solution of a reducing agent (SFS, 0.57 g) and de-ionized water (4.73 g). The reaction was held at 50° C. for one hour. Cooling was resumed to a temperature <30° C. at which point the latex was bottled out.

Example 2

Additional PSA latices were synthesized in accordance with the reaction scheme detailed in Example 1. These compositions then were evaluated for their adhesive performance on stainless steel. The ingredients used and the test results recorded are set forth below

TABLE 2

| | 6337-(g) | | | | |
|---|---|---|---|---|---|
| | 101 | 103 | 105 | 110 | 112 |
| Acrylic acid | 21.3 | 21.3 | 21.3 | 21.3 | 21.3 |
| 2-Ethyl hexylacrylate | 575.1 | 575.1 | 575.1 | 575.1 | 575.1 |
| Butyl acrylate | 397.6 | 397.6 | 397.6 | 468.6 | 539.6 |
| Methyl acrylate | 142.0 | 142.0 | 142.0 | 142.0 | 142.0 |
| Styrene | 284.0 | 284.0 | 284.0 | 213.0 | 142.0 |
| n-Isobutoxymethyl acrylamide | 10.7 | 10.7 | 10.7 | 10.7 | 10.7 |
| 1,3-Butanediol dimethacrylate | 3.6 | 3.6 | 0.7 | 3.6 | 3.6 |
| Hitenol BC-10 | 110.8 | 82.8 | 110.8 | 82.8 | 82.8 |
| Shear (hrs) ½" × 1" 1000 g | 14.8c* | 15.5c | 10.2c | 3.9c | 4.2c |

TABLE 2-continued

| | 6337-(g) | | | | |
|---|---|---|---|---|---|
| | 101 | 103 | 105 | 110 | 112 |
| 15 min Peel (lb/in) | 3.0 | 2.9 | 2.9 | 2.3 | 2.3 |
| 24 hr peel (lb/in) | 4.5 | 3.9 | 3.8 | 3.3 | 5.7c |

"c" denotes cohesive failure

The above-tabulated test results on stainless steel demonstrate that the inventive PSA, while formulated for use on vinyl foams, possesses adhesive qualities making it useful as a PSA in a variety of additional applications.

Example 3

PVC foam parts are used in the automotive industry. Although each automotive manufacturer has its own tests to qualify a PVC foam PSA, all of these tests are based on ASTM D-903 (peels and heat-aged peels) and ASTM D1183 (cycle testing). Such testing is reported in this Example.

Samples of 6337-103 PSA were direct coated at 2.5–2.7 mil (dry) on a 7 lb (density) PVC foam. The construction was dried in a forced air oven at 90° C. for 5 minutes then laminated to a 90# release liner. The samples were allowed to equilibrate overnight at 72° F./50% RH (RH is relative humidity). The following tests were run:

TABLE 3

180° Peel at initial conditions

| TEST | 180° PEEL ADHESION (METHOD PSTC-1) |
|---|---|
| Roller | 2.05 kg (4.5 lb) |
| Panel | Stainless Steel |
| Equipment | Instron Model 1130 Blue M Oven #12 Model OV-480A-2 |
| Conditions | 72° C. and 50% RH |
| Duration | 24 hours |
| Cross head Speed | 12 in/min |
| Evaluation | • record average value in oz./in. |
| | • visual evaluation |

TABLE 4

180° Peel after elevated temperature testing of 50° C.

| TEST | 180° PEEL ADHESION (METHOD PSTC-1) |
|---|---|
| Roller | 2.05 kg (4.5 lb) |
| Panel | Stainless Steel |
| Equipment | Instron Model 1130, Blue M Oven #12 Model OV-480A-2 |
| Conditions | 50° C. |
| Duration | 72 hours, recovery 24 hours at 72° C. and 50% RH |
| Cross head Speed | 12 in/min |
| Evaluation | • record average value in oz/in. |
| | • visual evaluation |

TABLE 5

180° Peel after elevated temperature testing of 80° C.

| TEST | 180° PEEL ADHESION METHOD PSTC-1 |
|---|---|
| Roller | 2.05 kg (4.5 lb) |
| Panel | Stainless Steel |

TABLE 5-continued

180° Peel after elevated temperature testing of 80° C.

| TEST | 180° PEEL ADHESION METHOD PSTC-1 |
|---|---|
| Equipment | Instron Model 1130, Blue M Oven #12 Model OV-480A-2 |
| Conditions | 80° C. |
| Duration | 250 hours, recovery 24 hours at 72° C. and 50% RH |
| Cross head Speed: | 12 in/min |
| Evaluation | • record average value in oz./in.<br>• visual evaluation |

TABLE 6

180° Peel after elevated temperature and humidity testing of 38° C. and 98% RH

| TEST | 180° PEEL ADHESION METHOD PSTC-1 |
|---|---|
| Roller | 2.05 kg (4.5 lb) |
| Panel | Stainless Steel |
| Equipment | Instron Model 1130, Blue M Model FRH-381C |
| Conditions | 38° C. and 98% RH |
| Duration | 250 hours, recovery 24 hours at 72° C. and 50% RH |
| Cross head Speed | 12 in/min |
| Evaluation | • record average value in oz./in.<br>• visual evaluation |

TABLE 7

180° Peel after cycle testing conditions

| TEST | 180° PEEL ADHESION METHOD PSTC-1 |
|---|---|
| Roller | 2.05 kg (4.5 lb) |
| Panel | Stainless Steel |
| Equipment | Instron Model 1130, Blue M FRH-381C, Blue M Oven #12 Model OV-480A-2, Revco Freezer Model ULT1475-3-A12 |
| Conditions | 4 cycles of: 38° C. and 98% RH 16 hours, −30° C. 4 hours, and 80° C. 4 hours |
| Duration | 96 hours, recovery 24 hours at 72° C. and 50% RH |
| Cross head Speed | 12 in/min |
| Evaluation | • record average value in oz./in.<br>• visual evaluation |

The results recorded for PSA 6337-103 are listed in the following table.

TABLE 8

180° Peel Test Results (oz/in)

| TEST | ON SS* | ON ABS* | ON PAINTED METAL* |
|---|---|---|---|
| 180° Peel @ 24 hr | 51.2 | 56.0 | 38.4 |
| and 23° C. | 72.0 | 59.2 | 48.0 |
|  | 72.0 | 60.8 | 48.0 |
| Mode of Failure** | a | a | a |
| Average | 65.1 | 58.7 | 44.8 |
| 180° Peel @ 72 hr | 76.8 | 104.0 | 62.4 |
| and 50° C. | 67.2 | 59.2 | 52.8 |
|  | 76.8 | 48.0 | 70.4 |
| Mode of Failure | c/ft | c/ft | ft |
| Average | 73.6 | 70.4 | 61.9 |
| 180° Peel @ 10 days | 41.6 | 38.4 | 49.6 |
| and 80° C. (oz./in.) | 51.2 | 40.0 | 52.8 |
|  | 51.2 | 36.8 | 49.6 |
| Mode of Failure** | c | a | c/ft |
| Average | 48.0 | 38.4 | 50.7 |
| 180° Peel @ 10 days | 70.4 | 44.8 | 44.8 |
| and 38° C./98% RH | 75.2 | 68.8 | 48.0 |
|  | 52.8 | 44.8 | 44.8 |
| Mode of Failure** | c/ft | c/ft | a/ft |
| Average | 66.1 | 52.8 | 45.9 |
| 180° Peel @ 4 cycles | 59.2 | 52.8 | 40.0 |
| 16 hr 38° C./98% RH, | 64.0 | 46.4 | 44.8 |
| 4 hr −30° C., 4 hr 80° C. | 70.4 | 41.6 | 49.6 |
| Mode of Failure** | ft | a/ft | ft |
| Average (oz./in.) | 64.5 | 46.9 | 44.8 |

*
SS is stainless steel.
ABS is an acrylonitrile/butadiene/styrene polymer.
Painted Metal is an exterior automotive finish on steel.
**Modes of failure key:
a = adhesive failure
c = cohesive failure
dl = delamination (transfer) of adhesive to substrate
ft = foam tear
z = zippy removal These tests demonstrate that the inventive PSA meets or exceeds the performance specifications established by all domestic automobile manufacturers.

Example 4

Samples of 6337-103 PSA were direct coated at 2.5–2.7 mil (dry) on PVC foam. The construction was dried in a forced air oven at 900 C for 5 minutes then laminated to a 90 lb release liner. The samples were allowed to equilibrate overnight at 72° F./50% RH. Testing included those test procedures as set forth in Example 2, Tables 3–7.

The results recorded are set forth in the following table.

TABLE 9

| Test | 6337-103 |
|---|---|
| 180° Peel @ 24 hr | 131.2 |
| and 23° C. on SS (oz./in.) | 136.0 |
|  | 126.4 |
| Mode of Failure | ft |
| Average (oz./in.) | 131.2 |
| 180° Peel @ 72 hr | 126.4 |
| and 50° C. on SS (oz./in.) | 121.6 |
|  | 116.8 |
| Mode of Failure | ft |
| Average (oz./in) | 121.6 |
| 180° Peel @ 10 days | 75.2 |
| and 80° C. on SS (oz./in.) | 64.0 |
|  | 72.0 |
| Mode of Failure | c |
| Average (oz./in.) | 70.4 |
| 180+ Peel @ 10 days | 107.2 |
| and 38° C./98% RH | 105.6 |
| On SS (oz./in.) | 105.6 |
| Mode of Failure | ft |
| Average (oz./in.) | 106.1 |
| 180° Peel # 4 cycles | 104.0 |
| 16 hr 38° C./98% RH | 104.0 |
| 4 hr −30° C., 4 hr 80° C. | 107.2 |
| Mode of Failure | ft |
| Average oz./in. | 105.1 |

Modes of failure key:
a=adhesive failure
c=cohesive failure
dl=delamination (transfer) of adhesive to substrate ft=foam tear
z=zippy removal Again, these data establish the excellent adhesive performance that the inventive PSA provides.

What is claimed is:

1. An aqueous pressure sensitive adhesive (PSA) resistant to plasticizer migration, which comprises:
   an aqueous latex emulsion having an average particle size diameter of not substantially above about 100 nm and made from a mixture of ethylenically-unsaturated monomers and oligomers that include one or more of N-(iso-butoxymethyl) acrylamide, N-methylol acrylamide, or 1,3-butanediol dimethacrylate;
   and emulsified in the presence of an emulsifier consisting essentially of:

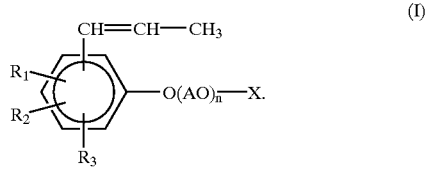

wherein,
$R_1$ is an alkyl, alkenyl, or aralkyl group containing between 6 and 18 carbon atoms,
$R_2$ is H or $R_1$,
$R_3$ is H or a propenyl group;
A is an alkylene group of 2 to 4 carbon atoms,
n is an integer ranging from 1 to 200, and
X is H or $SO_3M$, where M is an alkali metal, an ammonium ion, or an alkanolamine cation.

2. The PSA of claim 1, wherein said emulsifier is represented by the following structure:

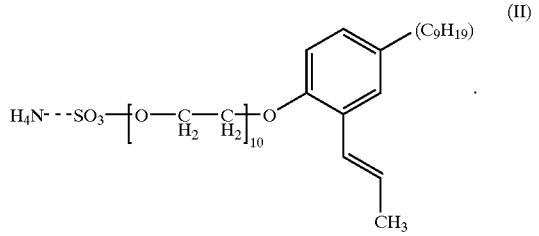

3. The PSA of claim 1, wherein said latex emulsion is prepared from a monomer mixture consisting essential of:
   a) at least one alkyl acrylate having at least 4 carbon atoms in the alkyl group,
   b) at least one ethylenically unsaturated carboxylic acid or its corresponding anhydride,
   c) at least one styrenic monomer, and
   d) one or more of N-(iso-butoxymethyl) acrylamide, N-(n-butoxymethyl) acrylamide, or N-methylol acrylamide,
in the presence of said emulsifier and a thermal free-radical initiator system.

4. The PSA of claim 3, wherein N-(iso-butoxymethyl) acrylamide is used to prepare said latex emulsion.

5. The PSA of claim 3, wherein said alkyl acrylate having at least 4 carbon atoms in the alkyl group is one or more of 1,3-butanediol dimethacrylate, butyl acrylate, 2-ethylhexyl acrylate, heptyl acrylate, octyl acrylate, isooctyl acrylate, isobutyl acrylate, or isodecyl acrylate.

6. The PSA of claim 3, where the ethylenically unsaturated carboxylic acid or its corresponding anhydride is one or more of acrylic acid, methacrylic acid, beta-carboxyethyl acrylate, maleic acid, fumaric acid, itaconic acid, or maleic anhydride.

7. The PSA of claim 3, wherein the styrenic monomer is one or more of styrene, tert-butyl styrene, dimethyl styrene, or vinyl toluene.

8. The PSA of claim 1, which further comprises a wetting agent.

9. The PSA of claim 4, wherein said ethylenically unsaturated carboxylic acid comprises acrylic acid, said styrenic monomer comprises styrene, said alkyl acrylate having at least 4 carbon atoms in the alkyl group comprises 1,3-butanediol dimethacrylate.

10. A laminate comprising:
    (a) a release liner,
    (b) a facestock, and
    (c) the PSA of claim 1 between and adhering the release liner and facestock.

11. A laminate comprising:
    (a) a release liner,
    (b) a facestock, and
    (c) the PSA of claim 2 between and adhering the release liner and facestock.

12. A laminate comprising:
    (a) a release liner,
    (b) a facestock, and
    (c) the PSA of claim 3 between and adhering the release liner and facestock.

13. A laminate comprising:
    (a) a release liner,
    (b) a facestock, and
    (c) the PSA of claim 4 between and adhering the release liner and facestock.

14. A laminate comprising:
    (a) a release liner,
    (b) a facestock, and
    (c) the PSA of claim 5 between and adhering the release liner and facestock.

15. A laminate comprising:
    (a) a release liner,
    (b) a facestock, and
    (c) the PSA of claim 6 between and adhering the release liner and facestock.

16. A laminate comprising:
    (a) a release liner,
    (b) a facestock, and
    (c) the PSA of claim 7 between and adhering the release liner and facestock.

17. A laminate comprising:
    (a) a release liner,
    (b) a facestock, and
    (c) the PSA of claim 8 between and adhering the release liner and facestock.

18. A laminate comprising:
    (a) a release liner,
    (b) a facestock, and
    (c) the PSA of claim 9 between and adhering the release liner and facestock.

* * * * *